(12) United States Patent
Sugizaki et al.

(10) Patent No.: US 11,456,462 B2
(45) Date of Patent: Sep. 27, 2022

(54) ELECTRODE, SECONDARY BATTERY, BATTERY PACK, AND VEHICLE

(71) Applicant: KABUSHIKI KAISHA TOSHIBA, Minato-ku (JP)

(72) Inventors: Tomoko Sugizaki, Kawasaki (JP); Tetsuya Sasakawa, Yokohama (JP); Kazuomi Yoshima, Yokohama (JP); Tomoe Kusama, Tokyo (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 428 days.

(21) Appl. No.: 16/787,232

(22) Filed: Feb. 11, 2020

(65) Prior Publication Data
US 2021/0083298 A1 Mar. 18, 2021

(30) Foreign Application Priority Data

Sep. 17, 2019 (JP) .............................. JP2019-168302

(51) Int. Cl.
| | |
|---|---|
| *H01M 4/66* | (2006.01) |
| *H01M 10/0525* | (2010.01) |
| *H01M 4/525* | (2010.01) |
| *H01M 4/505* | (2010.01) |
| *H01M 4/02* | (2006.01) |

(52) U.S. Cl.
CPC .......... *H01M 4/665* (2013.01); *H01M 4/505* (2013.01); *H01M 4/525* (2013.01); *H01M 4/661* (2013.01); *H01M 10/0525* (2013.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 10,446,841 B2 | 10/2019 | Yasuda et al. | |
| 2010/0092846 A1 | 4/2010 | Inagaki et al. | |
| 2016/0006073 A1* | 1/2016 | Inagaki ............. | H01M 10/0525 429/163 |
| 2016/0276663 A1* | 9/2016 | Yoshida ................ | H01M 4/485 |

FOREIGN PATENT DOCUMENTS

| | | |
|---|---|---|
| JP | 2010-97720 A | 4/2010 |
| JP | 2016-177974 A | 10/2016 |
| JP | 2018-160420 A | 10/2018 |

OTHER PUBLICATIONS

Abramoff, M. D. et al., "Image Processing with ImageJ," reprinted from the Jul. 2004 issue of Biophotonics International copyrighted Laurin Publishing Co., Inc., 7 pages.

* cited by examiner

*Primary Examiner* — Wyatt P McConnell
(74) *Attorney, Agent, or Firm* — Oblon, McClelland, Maier & Neustadt, L.L.P.

(57) ABSTRACT

According to one embodiment, an electrode is provided. The electrode includes a current collector, a first layer formed on the current collector, and a second layer formed on at least part of the first layer. The first layer contains a monoclinic niobium titanium composite oxide. The second layer contains lithium titanate having a spinel structure. A porosity P2 of the second layer is within a range from 30% to 80%.

13 Claims, 7 Drawing Sheets

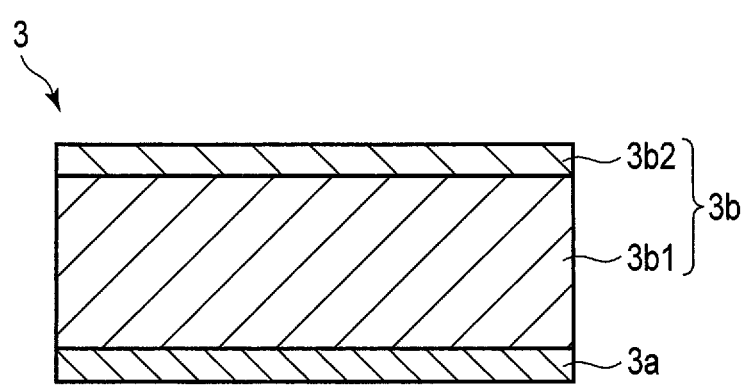
F I G. 1

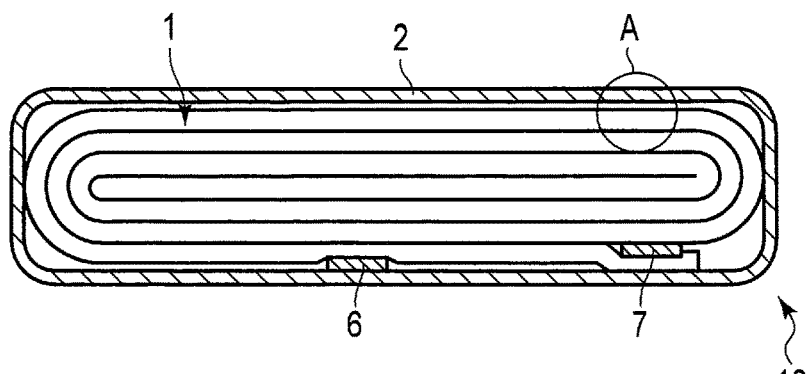
F I G. 2
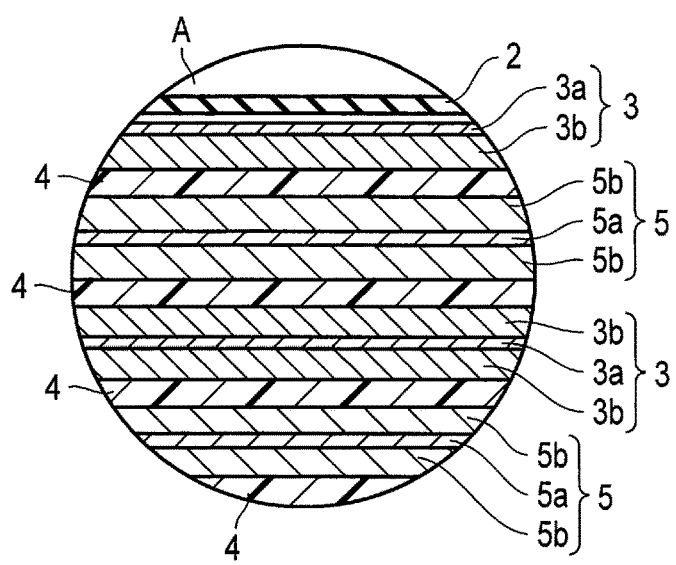
F I G. 3
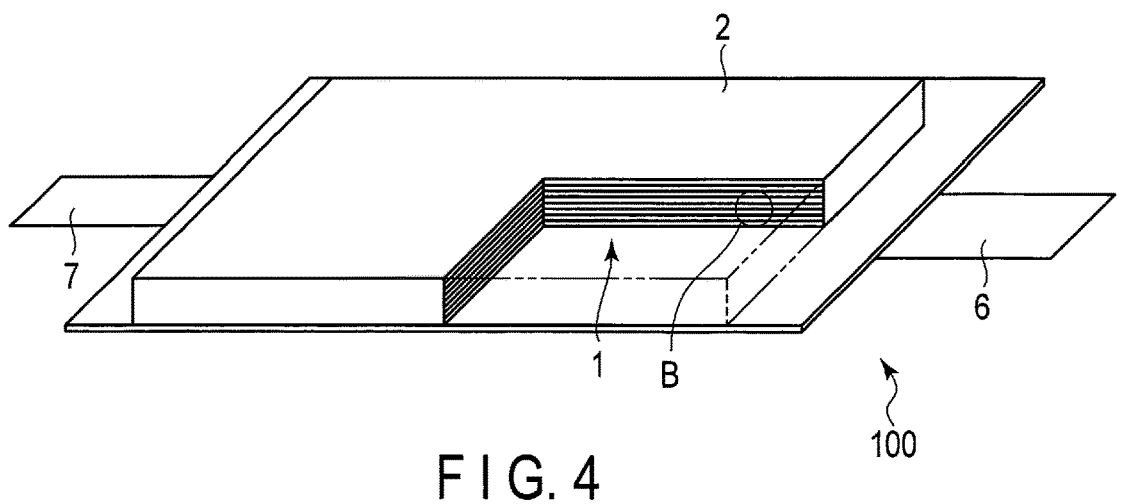
F I G. 4

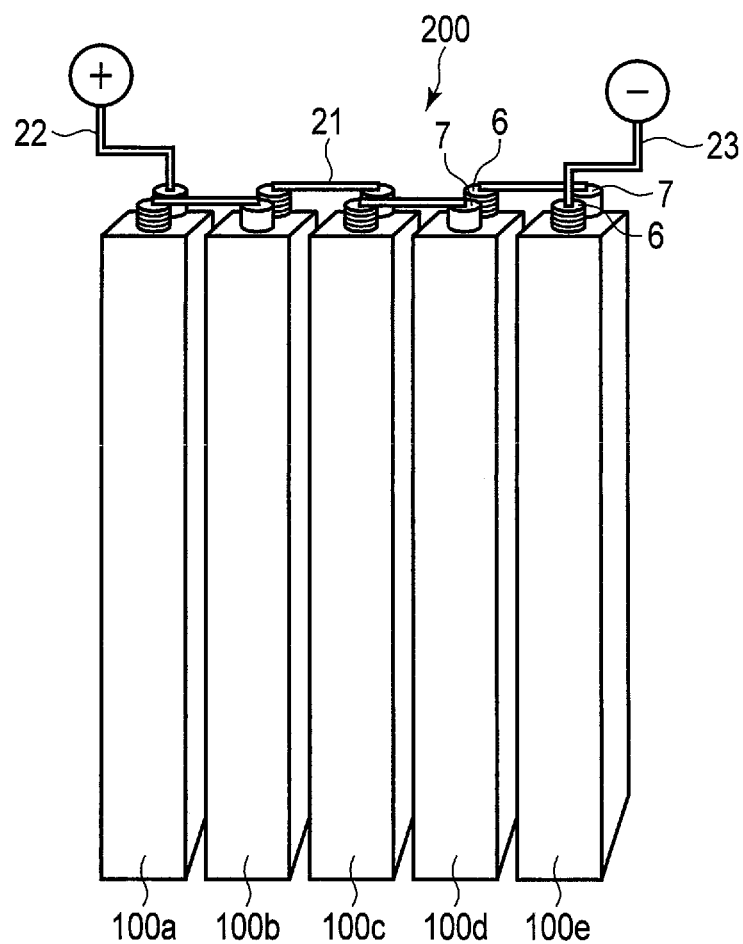
F I G. 6

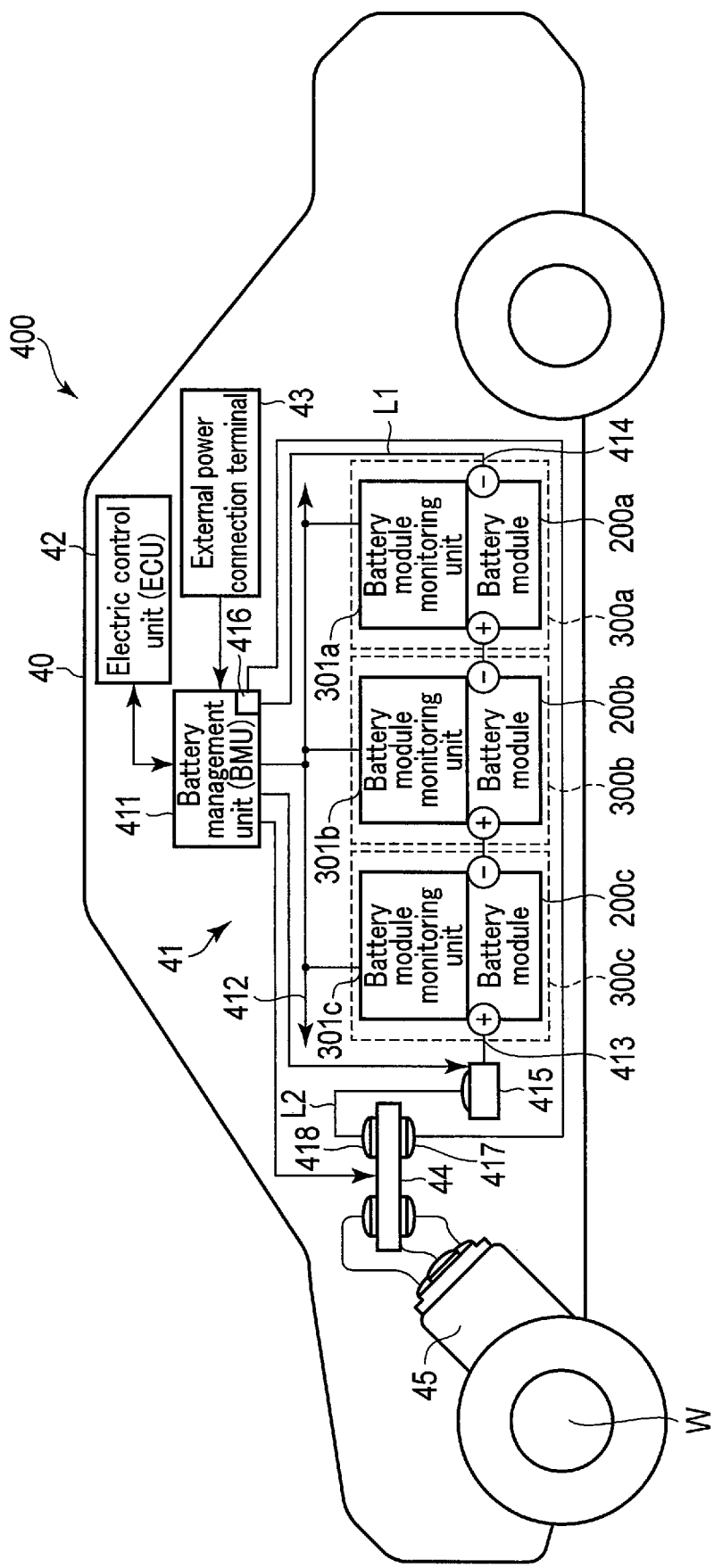
F I G. 10

ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2019-168302, filed Sep. 17, 2019, the entire contents of which are incorporated herein by reference.

FIELD

Embodiments described herein relate generally to an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. Li/Li$^+$) relative to metallic lithium, which is higher (i.e., more noble) in comparison to potentials of carbon based negative electrodes. The potential of an oxide of titanium is attributed to the redox reaction between Ti$^{3+}$ and Ti$^{4+}$ upon electrochemical insertion and extraction of lithium, and is therefore electrochemically restricted. It is also a fact that rapid charge/discharge of lithium ions can be performed stably at a high electrode potential of about 1.5 V (vs. Li/Li$^+$).

On the other hand, considering the capacity per unit weight, the theoretical capacity of titanium dioxide (anatase structure) is about 165 mAh/g, and the theoretical capacity of spinel type lithium-titanium composite oxides such as Li$_4$Ti$_5$O$_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In view of the above, novel electrode materials containing Ti and Nb have been studied. Such a niobium titanium composite oxide material is expected to have a high charge/discharge capacity. In particular, the composite oxide represented by TiNb$_2$O$_7$ has a high theoretical capacity exceeding 380 mAh/g. Therefore, a niobium titanium composite oxide is expected as a high capacity material which replaces Li$_4$Ti$_5$O$_{12}$. However, an electrode containing a niobium titanium composite oxide involve a problem of difficulty in reducing the resistance with counter electrodes.

BRIEF DESCRIPTION OF THE DRAWINGS

FIG. 1 is a cross-sectional view schematically illustrating one example of an electrode according to an embodiment;

FIG. 2 is a cross-sectional view schematically illustrating one example of a secondary battery according to an embodiment;

FIG. 3 is an enlarged cross-sectional view of a portion A of the secondary battery illustrated in FIG. 2;

FIG. 4 is a partially cut-away perspective view schematically illustrating another example of the secondary battery according to the embodiment;

FIG. 6 is a perspective view schematically illustrating one example of a battery module according to an embodiment;

FIG. 10 is a diagram schematically illustrating one example of a control system related to an electrical system in the vehicle according to the embodiment.

DETAILED DESCRIPTION

Figure 5:
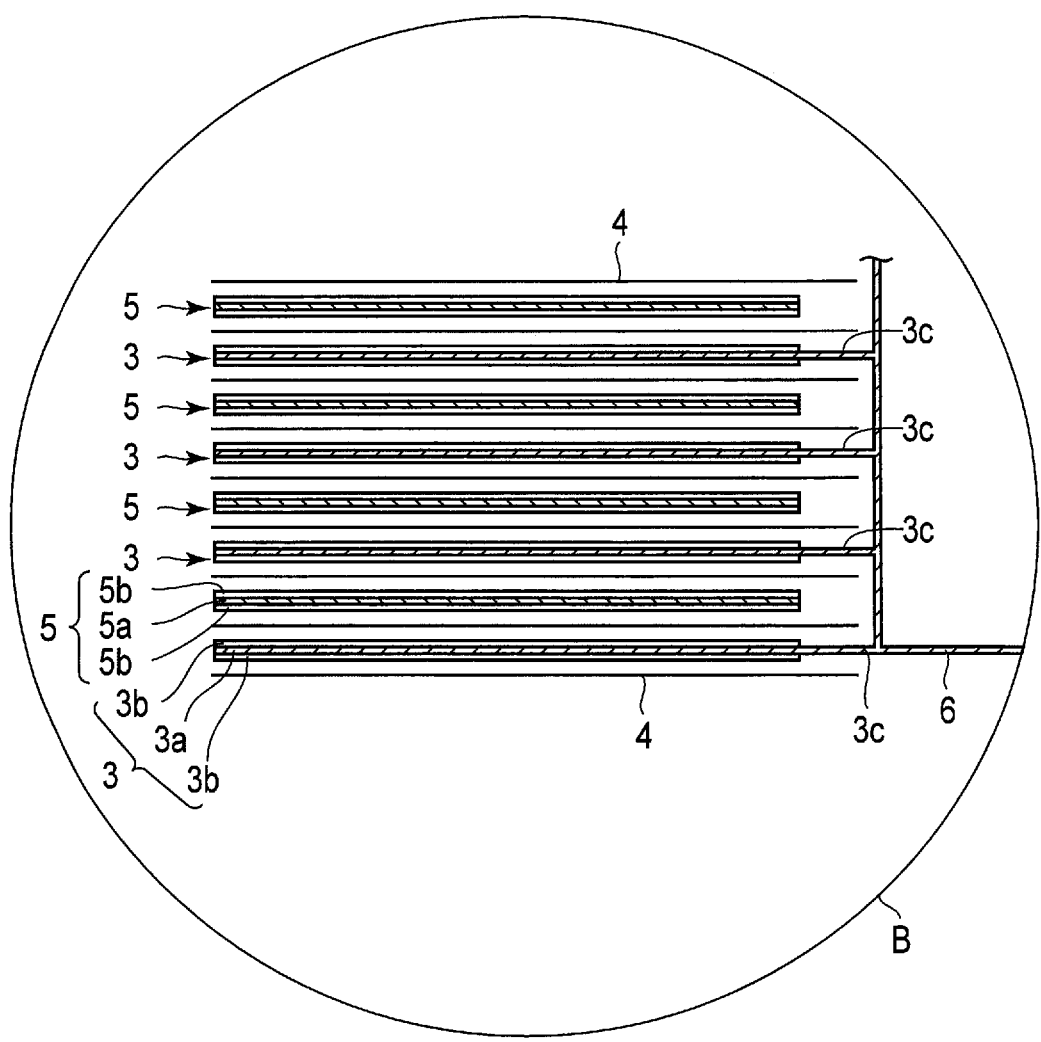
FIG. 5 is an enlarged cross-sectional view of a portion B of the secondary battery illustrated in FIG. 4.

According to the first embodiment, an electrode is provided. The electrode includes a current collector, a first layer formed on the current collector, and a second layer formed on at least part of the first layer. The first layer contains a monoclinic niobium titanium composite oxide. The second layer contains lithium titanate having a spinel structure. A porosity P2 of the second layer is within a range from 30% to 80%.

According to another embodiment, a secondary battery is provided. The secondary battery includes the electrode according to the embodiment.

According to another embodiment, a battery pack is provided. The battery pack includes the secondary battery according to the embodiment.

According to another embodiment, a vehicle is provided. The vehicle includes the battery pack according to the embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to the first embodiment, an electrode is provided. The electrode includes a current collector, a first layer formed on the current collector, and a second layer formed on at least part of the first layer. The first layer contains a monoclinic niobium titanium composite oxide. The second layer contains lithium titanate having a spinel structure. A porosity P2 of the second layer is within a range from 30% to 80%.

The monoclinic niobium titanium composite oxide has a higher surface reactivity than that of lithium titanate having a spinel structure, and is liable to side-react with an electrolyte solution or the like. Thus, self-discharge amount (self-discharge amount per unit time) of the monoclinic niobium titanium composite oxide tends to be large. In order to reduce the internal resistance in a secondary battery, for example, it is effective to reduce the distance between a positive electrode and a negative electrode by reducing the film thickness of a separator. However, since the electrode containing a monoclinic niobium titanium composite oxide has a relatively large self-discharge amount for the above reason, there is a problem that the self-discharge amount is further increased when the distance between the electrode and a counter electrode is short.

The electrode according to the embodiment includes the second layer containing lithium titanate having a spinel structure on the first layer containing a monoclinic niobium titanium composite oxide. Lithium titanate having a spinel structure has a higher insulation resistance than that of the monoclinic niobium titanium composite oxide, and can function as an insulator when the battery is in a discharged state. Therefore, the self-discharge amount can be reduced by providing the second layer on the first layer.

When the present inventors have found that, when the self-discharge amount is reduced by providing the second layer, a low porosity of the second layer causes a problem of reduction in conductivity of alkali metal ions such as lithium ions, leading to increase in internal resistance.

In the electrode according to the embodiment, the porosity of the second layer containing lithium titanate having a spinel structure is within a range from 30% to 80%. Therefore, the conduction of alkali metal ions from the counter electrode to the electrode is less likely to be hindered by the second layer, so that the ion conductivity is excellent. That is, the internal resistance can be reduced.

For the reasons described above, the electrode according to the embodiment can realize a low-resistance secondary battery which hardly self-discharges.

Hereinafter, the electrode according to the embodiment will be described in detail.

The electrode includes a current collector, a first layer formed on the current collector, and a second layer formed on at least part of the first layer. When the second layer is formed on part of the first layer, the second layer is formed, for example, at a portion of the electrode opposite to the counter electrode. According to one example, the second layer may not be formed in a portion of the electrode that is not opposite to the counter electrode. The second layer may be formed on both the portion of the electrode opposite to the counter electrode and the portion thereof not opposite to the counter electrode. The first layer and the second layer are laminated along the thickness direction of the electrode, and can constitute an active material-containing layer. The first layer and the second layer may be formed on one side or both sides of the current collector. The first layer contains a monoclinic niobium titanium composite oxide as the active material. The second layer contains lithium titanate having a spinel structure as the active material. Details of the first layer and the second layer will be described later. The electrode according to the embodiment may be a negative electrode or a positive electrode. The electrode according to the embodiment is, for example, a battery electrode or a secondary battery electrode.

The porosity P1 of the first layer is, for example, within a range from 20% to less than 30%, preferably within a range from 22% to 28%. If the porosity P1 of the first layer is excessively low, there is a possibility that the electrolyte solution may be depleted and that the resistance may be increased, which is not preferable. If the porosity P1 of the first layer is excessively high, the volume energy density is lowered, which is not preferable.

The porosity P2 of the second layer is, for example, within a range from 30% to 80%, preferably within a range from 35% to 70%, more preferably within a range from 35% to 60%, further more preferably within a range from 35% to 50%. If the porosity P2 of the second layer is less than 30%, alkali metal ions, as a charge carrier, are difficult to permeate the second layer, thereby causing reduction ion conductivity and increase in internal resistance, which is not preferable. If the porosity P2 of the second layer exceeds 80%, the second layer is difficult to function as an insulator, and it becomes difficult to suppress self-discharge in the first layer. If the porosity P2 of the second layer is within a range from 30% to 80%, the second layer easily allows alkali metal ions to permeate regardless of the charge state of the battery, so that the internal resistance can be reduced. In addition, the reduction in self-discharge amount and the reduction in internal resistance can be achieved in a well-balanced manner.

A ratio P2/P1 of the porosity P2 of the second layer to the porosity P1 of the first layer is, for example, within a range from greater than 1 to 3.5. The ratio P2/P1 is preferably within a range from 1.1 to 2.8, more preferably within a range from 1.2 to 2.8. A ratio P2/P1 of 1 or less is not preferable because the internal resistance may increase. A ratio P2/P1 exceeding 3.5 is not preferable since self-discharge may increase.

A thickness T1 of the first layer is not particularly limited, but is, for example, within a range from 10 μm to 100 μm.

A thickness T2 of the second layer is, for example, within a range from 0.5 μm to 10 μm, preferably within a range from 2 μm to 10 μm, more preferably within a range from 4 μm to 8 μm. If the second layer is too thin, self-discharge may not be sufficiently suppressed. If the second layer is too thick, the internal resistance of the secondary battery increases, which is not preferable.

A ratio T2/T1 of the thickness T2 of the second layer to the thickness T1 of the first layer is, for example, within a range from 0.005 to 1, preferably within a range from 0.01 to 1, more preferably within a range from 0.05 to 0.5. If the ratio T2/T1 is too small, self-discharge may not be sufficiently suppressed. If the ratio T2/T1 is excessively large, the thickness of the second layer occupying the thickness of the electrode active material-containing layer increases. Thus, there is a tendency that the volume of the first layer decreases and that the battery capacity decreases.

<Methods of Measuring Thicknesses and Porosities of First Layer and Second Layer>

The thicknesses of the first layer and the second layer can be measured by performing SEM-EDX (Scanning Electron Microscope-Energy Dispersive X-ray Spectroscopy) on the cross section of the electrode. Further, the porosities of the first layer and the second layer can be determined by applying binarization processing to a SEM image obtained by SEM observation and calculating the area of a void part with respect to the area of the entire image as a percentage. For example, Image J shown in "Dr. Michael et al., Image Processing with ImageJ, Reprinted from the July 2004 issue of Biophotonics International copyrighted by Laurin Publishing Co. INC." can be used as image processing software. Hereinafter, a method of measuring the thicknesses of the first layer and the second layer and a method of measuring the porosities of the first layer and the second layer will be specifically described.

First, the secondary battery to be analyzed is put into a discharged state. For example, in a 25° C. environment, the secondary battery can be put into a discharged state by discharging it to a rated end voltage with a 0.1C current. The secondary battery in the discharged state is disassembled in a glove box filled with argon. The electrode to be measured is taken out from the disassembled battery. The electrode is washed with a suitable solvent. As a solvent used for washing, for example, ethyl methyl carbonate can be used.

The target electrode is cut with an ion milling device. When the electrode is cut, the electrode is cut along the thickness direction. The cross section of the cut electrode is applied to a SEM stage. At this time, a treatment is performed using a conductive tape or the like so that the electrode does not peel away or rise up from the stage. The electrode applied to the SEM stage is observed with SEM to obtain a SEM image. Note that an inert atmosphere is preferably maintained when the electrode is introduced into the stage.

When the thickness of each of the layers is measured, the cross section of the electrode is observed using SEM at an observation magnification of 5000×. EDX is performed together with SEM observation, whereby the concentration distribution of the main component of the active material contained in each of the first layer and the second layer can be measured. Thus, the boundary between the first layer and the second layer can be determined. For example, a line profile of titanium or the like is observed along the laminating direction of the first layer and the second layer, and the thickness of the second layer is measured using the inflection point as the interface of the second layer to the first layer. When the second layer contains lithium titanate having a spinel structure, the thickness of the second layer can be measured by measuring the concentration distribution of titanium or oxygen. A region from one end of the SEM image to the other end is divided into four equal parts along a direction perpendicular to the laminating direction of the first layer and the second layer, and the thickness measurement described above is performed at the center position of each region. The thicknesses of the first layer and the second layer in each region are each averaged to calculate the thicknesses of the first layer and the second layer, respectively.

The porosities of the first layer and the second layer can be determined from a SEM image obtained by observing each of the layers at a magnification of 10,000×. In the SEM image, voids are mainly observed in black, and the other portions where the material is observed are mainly observed in white. Within the field of view in the obtained SEM image, boundaries of particles containing a monoclinic niobium titanium composite oxide (or lithium titanate having a spinel structure), a conductive material, and a binder are distinguished from the contrast and shape. Along the boundaries, outlines are drawn along the surfaces of the respective particles. With the outlines as the boundaries, the SEM image is subjected to binarization processing so that the void part and the other portion can be distinguished from each other, and the area of the void part with respect to the area of the entire image is determined as a percentage, whereby the porosities of the first layer and the second layer can be calculated respectively. When the porosities are calculated, for example, the cut surface of the first layer is randomly observed at five locations, the porosities at the respective observation points are calculated, and then the average value of these porosities is the porosity of the first layer. The same applies to the second layer.

The crystal structure of the niobium titanium composite oxide contained in the first layer and the crystal structure of lithium titanate contained in the second layer can be confirmed by powder X-ray diffraction (XRD). As a powder X-ray diffraction measurement apparatus, for example, SmartLab manufactured by Rigaku Corporation or an apparatus having a function equivalent to that of the apparatus is used. The measurement conditions are as follows:

X-ray source: Cu target;
Output: 45 kV 200 mA;
Solar slit: 5' for both incidence and light reception;
Step width (2θ): 0.02 deg;
Scanning speed: 20 deg/min;
Semiconductor detector: D/teX Ultra 250;
Sample plate holder: flat glass sample plate holder (thickness: 0.5 mm); and
Measurement range: $5°<2θ<90°$ The density of the first layer is for example within a range from $2.0 \text{ g/cm}^3$ to $3.5 \text{ g/cm}^3$, preferably within a range from $2.5 \text{ g/cm}^3$ to $3.0 \text{ g/cm}^3$.

The density of the second layer is for example within a range from $1.5 \text{ g/cm}^3$ to $3.0 \text{ g/cm}^3$, and preferably within a range from $1.5 \text{ g/cm}^3$ to $2.2 \text{ g/cm}^3$. When the density of the second layer is high, the porosity of the second layer tends to be small, and self-discharge is easily suppressed. However, the internal resistance tends to increase.

For the current collector, a material that is electrochemically stable at a potential at which lithium (Li) is inserted into or extracted from the active material is used. For example, when the electrode according to the embodiment functions as the negative electrode, the current collector is preferably made from an aluminum alloy containing one or more elements selected from copper, nickel, stainless steel or aluminum, or Mg, Ti, Zn, Mn, Fe, Cu, and Si. The thickness of the current collector is preferably within a range from 5 μm to 20 μm. The current collector having such a thickness can balance the strength and weight reduction of the electrode.

In addition, the current collector can include a portion where the active material-containing layer is not formed on the surface thereof. This portion can act as a current collecting tab.

The first layer contains one or more monoclinic niobium titanium composite oxides as the active material. The first layer may also contain one or more active materials other than the monoclinic niobium titanium composite oxide. The proportion of the mass of the monoclinic niobium titanium composite oxide in the mass of the active material contained in the first layer is, for example, 68% or more, preferably 96% or more. The first layer can further contain a conductive agent and a binder.

The second layer contains one or more types of lithium titanate having a spinel structure as the active material. The second layer may also contain one or more active materials other than lithium titanate having a spinel structure. The proportion of the mass of the lithium titanate having a spinel structure in the mass of the active material contained in the second layer is, for example, 68% or more, preferably 96% or more. The second layer can further contain a conductive agent and a binder.

The monoclinic niobium titanium composite oxide is, for example, at least one selected from the group consisting of a composite oxide represented by the general formula $Li_xTi_{1-y}M1_yNb_{2-z}M2_zO_{7+\delta}$, and a composite oxide represented by the general formula $Li_xTi_{1-y}M3_{y+z}Nb_{2-z}O_{7-\delta}$. Here, M1 is at least one selected from the group consisting of Zr, Si, and Sn. M2 is at least one selected from the group consisting of V, Ta, and Bi. M3 is at least one selected from Mg, Fe, Ni, Co, W, Ta, and Mo. The subscripts in the composition formula satisfy $0 \leq x \leq 5$, $0 \leq y < 1$, $0 \leq z < 2$, and $-0.3 \leq \delta \leq 0.3$, respectively.

Specific examples of the monoclinic niobium titanium composite oxide include $Nb_2TiO_7$, $Nb_2Ti_2O_9$, $Nb_{10}Ti_2O_{29}$, $Nb_{14}TiO_{37}$, and $Nb_{24}TiO_{62}$. The monoclinic niobium titanium composite oxide may be a substituted niobium titanium composite oxide in which at least part of Nb and/or Ti is substituted with a dopant. Examples of substitution elements are Na, K, Ca, Co, Ni, Si, P, V, Cr, Mo, Ta, Zr, Mn, Fe, Mg, B, Pb, and Al. The substituted niobium titanium composite oxide may contain one kind of substitution element, and may contain two or more kinds of substitution elements.

The lithium titanate having a spinel structure is, for example, a compound represented by the general formula $Li_{4+a}Ti_5O_{12}$ ($-1 \leq a \leq 3$). The subscript a in the general formula is a variable that can vary within the above range depending on the charge state of lithium titanate.

Examples of active materials other than monoclinic niobium titanium composite oxides and active materials other than lithium titanate having a spinel structure include lithium titanate having a ramsdellite structure (e.g., $Li_{2+y}Ti_3O_7$, $0 \leq y \leq 3$).), monoclinic titanium dioxides ($TiO_2$), anatase titanium dioxides, rutile titanium dioxides, hollandite titanium composite oxides, and orthorhombic titanium composite oxides.

An example of the orthorhombic titanium-containing composite oxide is a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb, and K. M(II) is at least one selected from the group consisting of Zr, Sn, V, Nb, Ta, Mo, W, Y, Fe, Co, Cr, Mn, Ni, and Al. Each subscript in the composition formulas is given such that $0 \leq a \leq 6$, $0 \leq b < 2$, $0 \leq c < 6$, $0 \leq d < 6$, and $-0.5 \leq \sigma \leq 0.5$. A specific example of the orthorhombic titanium-containing composite oxide is $Li_{2+a}Na_2Ti_6O_{14}$ ($0 \leq a \leq 6$).

The monoclinic niobium titanium composite oxide may be contained in the first layer in the form of primary particles, or may be contained in the first layer in the form of secondary particles formed by aggregation of the primary particles. The proportion of the secondary particles in the monoclinic niobium titanium composite oxide can be, for example, 50% by volume or more.

Whether the monoclinic niobium titanium composite oxide is a secondary particle or a primary particle can be determined by the above-described scanning electron microscope (SEM) observation.

When the monoclinic niobium titanium composite oxide is a secondary particle, the average secondary particle size is preferably within a range from 1 μm to 100 μm. When the average secondary particle size is within this range, it is easy to handle the monoclinic niobium titanium composite oxide in industrial applications. Also, it is possible to make the mass and thickness uniform in the coating film for producing the electrode, and further to prevent reduction of the surface smoothness of the electrode. The average particle size of the secondary particles is more preferably within a range from 1 μm to 20 μm.

Regarding the monoclinic niobium titanium composite oxide, the primary particles constituting the secondary particles preferably have an average primary particle size (d50) ranging from 1 nm to 10 μm. When the average primary particle size is within this range, it is easy to handle the monoclinic niobium titanium composite oxide in industrial applications. Also, it is possible to promote the diffusion of lithium ions in a solid of the monoclinic niobium titanium composite oxide. The average primary particle size is more preferably within a range of 10 nm to 1 μm.

Regarding the monoclinic niobium titanium composite oxide, the primary particles are preferably isotropic. In the present embodiment, the isotropic particle means a particle having an aspect ratio of 3 or less. It can be confirmed by scanning electron microscopy (SEM) observation that the primary particles are isotropic particles.

Regarding the monoclinic niobium titanium composite oxide, the BET specific surface area is not particularly limited, but is preferably within a range from 0.1 m²/g to less than 100 m²/g.

When the BET specific surface area is 0.1 m²/g or more, a contact area between the active material and the electrolyte can be secured, so that a good discharge rate performance can be easily obtained. In addition, the charging time can be shortened. On the other hand, when the BET specific surface area is less than 100 m²/g, the reactivity between the active material and the electrolyte does not become too high, and the life performance can be improved. Moreover, in this case, the coatability of a slurry containing the active material, which is used for manufacturing the electrode as will be described later, can be improved.

The specific surface area is measured by a method in which molecules having a known adsorption occupation area are adsorbed on the powder particle surfaces at the temperature of liquid nitrogen and the specific surface area of the sample is obtained from the amount. A BET method based on low-temperature, low-humidity physical adsorption of an inert gas is most often used. This BET method is based on the BET theory, which is the most famous theory as a method of calculating a specific surface area, by expanding the Langmuir theory, which is a monomolecular layer adsorption theory, to multimolecular layer adsorption. The specific surface area determined by this method is referred to as the BET specific surface area.

At least part of the primary particles or secondary particles of the monoclinic niobium titanium composite oxide may be coated with a carbon material. Conductivity can be improved by arranging a carbon material on the surfaces. The existence state of carbon can be assessed by line analysis or carbon mapping by applying an electron probe microanalyzer (EPMA) to the cross section of the active material.

The amount of the carbon material provided on the surfaces of the monoclinic niobium titanium composite oxide particles is preferably within a range from 0.1% by mass to 5% by mass in a mass ratio (the total mass of the carbon material and the monoclinic niobium titanium composite oxide particles is 100% by mass). A more preferable mass ratio is within a range from 0.2% by mass to 3% by mass.

The lithium titanate having a spinel structure may be contained in the second layer in the form of primary particles, or may be contained in the second layer in the form of secondary particles formed by aggregation of the primary particles. The proportion of the primary particles in the lithium titanate having a spinel structure may be, for example, 50% by volume or more.

It can be determined by scanning electron microscopy (SEM) observation that the lithium titanate having a spinel structure is in the form of secondary particles or primary particles.

The particle size of the lithium titanate having a spinel structure can be controlled by the manufacture method. For example, the average primary particle size (d50) of the lithium titanate having a spinel structure can be within a range from 0.1 μm to 30 μm, more preferably within a range from 1 μm to 10 μm.

The conductive agent is blended in order to improve the current collection performance and to suppress the contact resistance between the active material and the current collector. Examples of the conductive agent include carbonaceous matters such as vapor grown carbon fiber (VGCF), carbon black such as acetylene black, fibrous carbon such as carbon nanotubes, and graphite. One of these may be used as the conductive agent, or a combination of two or more thereof may be used as the conductive agent. Alternatively, instead of using the conductive agent, a carbon coat or an electronically conductive inorganic material coat may be applied to the surfaces of the active material particles. When the conductive agent contains fibrous carbon, electronic conductivity between the primary particles of the active material can be further increased.

The binder is blended to fill a gap between the dispersed active materials and to bind the active material and the negative electrode current collector. Examples of the binder include polytetrafluoroethylene (PTFE), polyvinylidene fluoride (PVDF), fluorine rubber, styrene butadiene rubber, polyacrylic acid compound, imide compound, carboxymethyl cellulose (CMC), and salts of the CMC. One of these materials may be used as the binder, or two or more of these materials may be combined and used as the binder.

The blending proportions of the active material, the conductive agent and the binder in the first layer can be appropriately changed depending on the use of the electrode. For example, the active material, the conductive agent and the binder are blended in proportions ranging from 68% by mass to 96% by mass, from 2% by mass to 30% by mass, and from 2% by mass to 30% by mass, respectively. By setting the amount of the conductive agent to 2% by mass or more, the current collection performance of the active material-containing layer can be improved. Further, by setting the amount of the binder to 2% by mass or more, the binding property between the active material-containing layer and the current collector becomes sufficient, so that an excellent cycle performance can be expected. On the other hand, preferably, the amounts of the conductive agent and the binder are each set to 30% by mass or less in order to increase the capacity.

The blending proportions of the active material, the conductive agent and the binder in the second layer can be appropriately changed depending on the use of the electrode. For example, the active material, the conductive agent and the binder are blended in proportions ranging from 68% by mass to 96% by mass, from 2% by mass to 30% by mass, and from 2% by mass to 30% by mass, respectively.

The porosity P1 of the first layer and the porosity P2 of the second layer can vary depending on the blending proportions of the active material, the conductive agent and the binder constituting these layers, and the natures of these components.

<Manufacture Methods>

The electrode can be produced, for example, by the following method.

First, an active material containing a monoclinic niobium titanium composite oxide, a conductive agent, and a binder are suspended in a solvent to prepare a first layer forming slurry. This slurry is applied to one side or both sides of the current collector. Examples of the application method include a micro gravure method. Next, the applied slurry is dried to obtain a laminate of the current collector and the first layer. Roll pressing is applied to this laminate. As conditions for applying roll pressing, the pressing load is, for example, 16 to 22 tons. The pressing speed is, for example, 1 m/min to 3 m/min. By pressing the laminate under these conditions, a first layer having a porosity ranging from about 20% to less than about 30% can be formed. When the pressing load is increased or the pressing speed is decreased, a first layer having a relatively low porosity can be formed.

Subsequently, an active material containing lithium titanate having a spinel structure, a conductive agent, and a binder are suspended in a solvent to prepare a second layer forming slurry. This slurry is applied onto at least part of the first layer. Examples of the application method include spray coating. Next, the applied slurry is dried to obtain a laminate in which the second layer is laminated on the first layer. Roll pressing is applied to this laminate. As conditions for applying roll pressing, the pressing load is, for example, 8 tons to 16 tons. Although roll pressing can be omitted when the second layer is formed, it is preferable to apply roll press. The pressing speed is, for example, 1 m/min to 3 m/min. By pressing the laminate under these conditions, a second layer having a porosity ranging from about 30% to about 80% can be formed. When the pressing load is decreased or the pressing speed is increased, a second layer having a relatively high porosity can be formed.

In the formation of the first layer, when the second layer forming slurry is applied and dried without pressing after application and drying of the first layer forming slurry, the first layer and the second layer are inevitably pressed together, so that the porosity of the second layer cannot be increased. For example, when the first layer and the second layer are pressed together with a relatively high pressing load for the purpose of increasing the energy density of the first layer containing a monoclinic niobium titanium composite oxide, it is difficult to manufacture a low-resistance electrode capable of suppressing self-discharge. On the other hand, in the production of the electrode according to the embodiment, pressing is performed at the time of forming the first layer as described above, and then the second layer forming slurry is applied onto the first layer. Thus, the pressing of the second layer can be performed separately from the pressing at the time of forming the first layer, so that the porosity of the second layer can be controlled within the desired numerical range.

One example of an electrode according to the embodiment is illustrated in FIG. 1. FIG. 1 is a cross-sectional view schematically illustrating one example of an electrode. An electrode 3 includes a current collector 3a, a first layer 3b1 formed on the current collector 3a, and a second layer 3b2 formed on the first layer 3b1. The first layer 3b1 and the second layer 3b2 constitute an active material-containing layer 3b.

According to the first embodiment, an electrode is provided. The electrode includes a current collector, a first layer formed on the current collector, and a second layer formed on at least part of the first layer. The first layer contains a monoclinic niobium titanium composite oxide. The second layer contains lithium titanate having a spinel structure. A porosity P2 of the second layer is within a range from 30% to 80%.

Therefore, the electrode according to the first embodiment can realize a secondary battery that has low resistance and is suppressed in self-discharge.

Second Embodiment

According to the second embodiment, a secondary battery including a negative electrode, a positive electrode, and an electrolyte is provided. The secondary battery includes the electrode according to the first embodiment as the negative electrode.

The secondary battery additionally can be equipped with a separator disposed between the positive electrode and the negative electrode. The negative electrode, the positive electrode, and the separator can constitute an electrode group. The electrolyte can be held in the electrode group.

The secondary battery additionally can be equipped with a container member that houses the electrode group and the electrolyte.

Furthermore, the secondary battery additionally can be equipped with a negative electrode terminal electrically connected to the negative electrode and a positive electrode terminal electrically connected to the positive electrode.

The secondary battery can be, for example, a lithium secondary battery. The secondary battery may be a nonaqueous electrolyte secondary battery including a nonaqueous electrolyte.

Hereinafter, the negative electrode, the positive electrode, the electrolyte, the separator, the container member, the negative electrode terminal, and the positive electrode terminal will be described in detail.

(1) Negative Electrode

The negative electrode equipped in the secondary battery according to the second embodiment can be, for example, the electrode described in the first embodiment.

The first layer can contain monoclinic niobium titanium composite oxide as a negative electrode active material. The second layer may contain lithium titanate having a spinel structure as a negative electrode active material. The active material-containing layer composed of the first layer and the second layer can be a negative electrode active material-containing layer. A polymer fiber layer, which will be described later, can be laminated on the second layer. The negative electrode on which the polymer fiber layer is laminated can be a negative electrode structure.

The negative electrode can be produced, for example, by a method similar to that for the electrode according to the first embodiment.

(2) Positive Electrode

The positive electrode can include a positive electrode current collector and a positive electrode active material-containing layer. The positive electrode active material-containing layer can be formed on one side or both sides of the positive electrode current collector. The positive electrode active material-containing layer can contain a positive electrode active material, and optionally a conductive agent and a binder. A polymer fiber layer, which will be described later, can be laminated on the positive electrode active material-containing layer. The positive electrode on which the polymer fiber layer is laminated may be a positive electrode structure.

Examples of the positive electrode active material include oxides and sulfides. The positive electrode may include, as the positive electrode active material, one type of compound or two or more different types of compounds. Examples of the oxides and the sulfides may include compounds allowing lithium or lithium ions to be inserted thereinto or extracted therefrom.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y\leq1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The positive electrode active material may preferably have primary particle sizes in the range of 100 nm to 1 μm. The positive electrode active material having primary particle sizes of 100 nm or more may be easy to handle in industrial applications. The positive electrode active material having primary particle sizes of 1 µm or less may allow lithium ions to be smoothly diffused in solid.

The positive electrode active material may preferably have a specific surface area in the range of 0.1 $m^2/g$ to 10 $m^2/g$. The positive electrode active material having a specific surface area of 0.1 $m^2/g$ or more may secure an adequately large site for insertion and extraction of Li ions. The positive electrode active material having a specific surface area of 10 $m^2/g$ or less may be easy to handle in industrial applications and may ensure a favorable charge-and-discharge cycle.

The binder is blended in order to fill a gap between the dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compounds, imide compounds, carboxy methyl cellulose (CMC), and salts of CMC. One of these may be used as the binder, or a combination of two or more thereof may be used as the binder.

A conductive agent is added in order to increase the current-collecting performance and suppress the contact resistance between the positive electrode active material and the positive electrode current collector. Examples of the conductive agent include carbonaceous matters such as vapor grown carbon fiber (VGCF) and carbon black. Examples of the carbon black include acetylene black and graphite. One of these materials may be used as the conductive agent, or two or more of these materials may be combined and used as the conductive agent. In addition, the conductive agent can be omitted.

In the positive electrode active material-containing layer, it is preferable to combine the positive electrode active material and the binder in a mass ratio of the positive electrode active material in a range from 80% to 98% and the binder in a range from 2% to 20%.

By making the amount of the binder be 2% by mass or greater, sufficient electrode strength is obtained. In addition, the binder may function as an insulator. For this reason, if the amount of the binder is kept at 20% by mass or less, the amount of insulation contained in the electrode is decreased, and therefore the internal resistance can be reduced.

In the case of adding the conductive agent, it is preferable to combine the positive electrode active material, the binder, and the conductive agent in a mass ratio of the positive electrode active material in a range from 77% to 95%, the binder in a range from 2% to 20%, and conductive agent in a range from 3% to 15%.

By making the amount of the conductive agent be 3% by mass or greater, the effects described above can be exhibited. Also, by keeping the amount of the conductive agent to 15% by mass or less, the proportion of the conductive agent in contact with electrolyte can be lowered. If this proportion is low, decomposition of the electrolyte under high-temperature storage can be reduced.

The positive electrode current collector is preferably an aluminum foil or an aluminum alloy foil containing one or more elements selected from Mg, Ti, Zn, Ni, Cr, Mn, Fe, Cu, and Si.

The thickness of the aluminum foil or aluminum alloy foil is preferably within a range from 5 µm to 20 µm, and is more preferably 15 µm or less. The purity of the aluminum foil is preferably 99% by mass or more. The content of transition metals such as iron, copper, nickel, and chromium contained in the aluminum foil or aluminum alloy foil is preferably 1% by mass or less.

In addition, the positive electrode current collector can include a portion where the positive electrode active material-containing layer is not formed on the surface thereof. This portion can serve as a positive electrode tab.

The positive electrode can be produced, for example, by the following method. First, an active material, a conductive agent, and a binder are suspended in a solvent to prepare a slurry. This slurry is applied to one side or both sides of the current collector. Next, the applied slurry is dried to obtain a laminate of the active material-containing layer and the current collector. Thereafter, the laminate is pressed. The positive electrode is thus produced.

Alternatively, the positive electrode may be produced by the following method. First, an active material, a conductive agent, and a binder are mixed to obtain a mixture. The mixture is then formed into pellets. Subsequently, these pellets can be arranged on the current collector to obtain a positive electrode.

(3) Electrolyte

Examples of the electrolyte may include nonaqueous liquid electrolyte or nonaqueous gel electrolyte. The nonaqueous liquid electrolyte may be prepared by dissolving an electrolyte salt used as solute in an organic solvent. The electrolyte salt may preferably have a concentration in the range of 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVDF), polyacrylonitrile (PAN), polyethylene oxide (PEO), and mixtures thereof.

Alternatively, besides the nonaqueous liquid electrolyte and the nonaqueous gel electrolyte, a room-temperature molten salt (ionic melt) containing lithium ions, a polymer solid electrolyte, an inorganic solid electrolyte, and the like may also be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

A polymer solid electrolyte is prepared by dissolving an electrolyte salt into a polymer material and solidifying the result.

An inorganic solid electrolyte is solid material having Li-ion conductivity.

The electrolyte may also be an aqueous electrolyte containing water.

The aqueous electrolyte includes an aqueous solvent and an electrolyte salt. The aqueous electrolyte is liquid, for example. A liquid aqueous electrolyte is an aqueous solution prepared by dissolving an electrolyte salt as the solute in an aqueous solvent. The aqueous solvent is a solvent containing 50% or more water by volume, for example. The aqueous solvent may also be pure water.

The aqueous electrolyte may also be an aqueous gel composite electrolyte containing an aqueous electrolytic solution and a polymer material. The polymer material may be, for example, polyvinylidene fluoride (PVDF), polyacrylonitrile (PAN), or polyethylene oxide (PEO).

The aqueous electrolyte preferably contains 1 mol or greater of aqueous solvent per 1 mol of the salt as the solute. In an even more preferably aspect, the aqueous electrolyte contains 3.5 mol or greater of aqueous solvent per 1 mol of the salt as the solute.

That the aqueous electrolyte contains water can be confirmed by gas chromatography-mass spectrometry (GC-MS) measurement. Also, the salt concentration and the amount of water contained in the aqueous electrolyte can be computed by measurement using inductively coupled plasma (ICP) emission spectroscopy or the like, for example. By measuring out a prescribed amount of the aqueous electrolyte and computing the contained salt concentration, the molar concentration (mol/L) can be computed. Also, by measuring the specific gravity of the aqueous electrolyte, the number of moles of the solute and the solvent can be computed.

The aqueous electrolyte is prepared by dissolving the electrolyte salt into the aqueous solvent at a concentration from 1 to 12 mol/L for example.

To suppress electrolysis of the aqueous electrolyte, LiOH, $Li_2SO_4$, or the like can be added to adjust the pH. The pH is preferably from 3 to 13, and more preferably from 4 to 12.

(4) Separator

The separator includes any one of a porous layer, a lithium ion conductor layer, and a laminate thereof. Each of the porous layer, the lithium ion conductor layer, and the laminate thereof has, for example, a sheet shape.

The thickness of the separator is, for example, within a range from 1 μm to 15 μm, preferably within a range from 2 μm to 10 μm. The thickness of the separator may be within a range from 3 μm to 10 μm. When the separator is thin, the distance between the positive and negative electrodes is short, and thus the effects of the electrode according to the embodiment, that is, the effects of suppressing self-discharge and reducing the resistance are easily obtained. The separator can be, for example, a laminate of a porous layer having a thickness ranging from 1 μm to 4 μm and a lithium ion conductor layer having a thickness ranging from 2 μm to 10 μm. In this case, the porous layer preferably faces the negative electrode, and the lithium ion conductor layer preferably faces the positive electrode.

Examples of the porous layer include a porous film, a nonwoven fabric, and a layer containing polymer fibers.

Examples of the porous film include a polyolefin porous film. As the polyolefin, for example, at least one of polyethylene and polypropylene can be used.

Examples of the nonwoven fabric include cellulose fiber nonwoven fabrics.

The layer containing polymer fibers includes a layer having a porous structure in which polymer fibers are arranged two-dimensionally or three-dimensionally. The layer containing polymer fibers is also referred to as a polymer fiber layer. Examples of polymer materials constituting polymer fibers include one or more selected from the group consisting of aramid, polyamideimide, polyamide, polyolefin, polyether, polyimide, polyketone, polysulfone, cellulose, polyvinyl alcohol (PVA), and polyvinylidene fluoride (PVdF). Examples of the polyolefin include polypropylene (PP) and polyethylene (PE). Examples of preferred polymer fibers include aramid fibers and cellulose fibers. Thus, the ion conduction resistance in the porous layer can be made small, and the low temperature performance, the cycle life, and the storage performance improve. The polymeric fiber layer can be an organic fiber layer.

The average fiber diameter of the polymer fibers can be set to be within a range from 0.05 μm to 10 μm. By setting the average fiber diameter to 0.05 μm or more, sufficient strength can be imparted to the porous layer. In addition, by setting the average fiber diameter to 10 μm or less, the amount of the organic electrolytic solution held in the porous layer can be made sufficient. Therefore, when the average fiber diameter is set to be within a range from 0.05 μm to 10 μm, the strength of the porous layer and the retention property of the organic electrolytic solution can be improved. A more preferable range of the average fiber diameter is within a range from 0.2 μm to 1 μm.

The layer containing polymer fibers is produced, for example, by an electrospinning method. In the electrospinning method, the polymer fiber layer is directly formed on a substrate by discharging a raw material solution from a spinning nozzle over the surface of the substrate while applying a voltage to the spinning nozzle using a high voltage generator. The applied voltage is appropriately determined according to the solvent/solute species, the boiling point/vapor pressure curve of the solvent, the solution concentration, the temperature, the nozzle shape, the sample-nozzle distance, etc. For example, the potential difference between the nozzle and the workpiece can be set to be within a range from 0.1 to 100 kV. The feeding rate of the raw material solution is also appropriately determined according to the solution concentration, the solution viscosity, the temperature, the pressure, the applied voltage, the nozzle shape, etc. In the case of a syringe type, for example, the feeding rate can be set to be within a range from about 0.1 to 500 μl/min per nozzle. In the case of a multiple nozzle or slit, the feeding rate may be determined according to the opening area.

As the raw material solution, a solution prepared by dissolving the above-described polymer material in the solvent is used. The concentration of the polymer material in the solvent can be set to be, for example, within a range from about 5 to 80% by mass. The solvent for dissolving the polymer material is not particularly limited, and any solvent such as dimethylacetamide (DMAc), dimethylsulfoxide (DMSO), N,N'-dimethylformamide (DMF), N-methylpyrrolidone (NMP), water, alcohols, etc. can be used. For the polymer material with low solubility, electrospinning is performed while the sheet-shaped polymer material is molten with a laser or the like. In addition, it is also acceptable to mix a high-boiling-point organic solvent and a low-melting-point solvent.

The porous layer may contain an organic electrolytic solution containing lithium ions.

The porous layer may contain a polymer. Examples of the polymer include polymers similar to those described for the lithium ion conductor layer.

The porosity of the porous layer is preferably within a range from 30% to 80%. The liquid or gel-like nonaqueous electrolyte is held in this void.

One or more kinds of components that can be contained in the porous layer described above, for example, polymer materials, polymer fibers, organic electrolytic solutions, polymers, etc. can be used.

The lithium ion conductor layer contains lithium-containing inorganic particles. The lithium-containing inorganic particles may be inorganic particles having no or low lithium ion conductivity, or may be inorganic solid electrolytes having high lithium ion conductivity. One or more kinds of lithium-containing inorganic particles can be used.

The lithium-containing inorganic particles having high lithium ion conductivity have a lithium ion conductivity at 25° C. of, for example, $1 \times 10^{-10}$ S/cm or more, preferably $1 \times 10^{-6}$ S/cm or more. On the other hand, inorganic particles having no or low lithium ion conductivity have a lithium ion conductivity at 25° C. of, for example, less than $1 \times 10^{-10}$ S/cm.

Examples of inorganic particles having no or low lithium ion conductivity include lithium aluminum oxides (for example, $LiAlO_2$, $Li_xAl_2O_3$, wherein $0 < x \leq 1$), lithium silicon oxides, and lithium zirconium oxides.

One example of the inorganic solid electrolyte having high lithium ion conductivity is an oxide solid electrolyte having a garnet-type structure. An oxide solid electrolyte having a garnet-type structure has advantages of high lithium ion conductivity and reduction resistance, and a wide electrochemical window. Examples of oxide solid electrolytes having a garnet-type structure include $Li_{5+x}A_xLa_{3-x}M_2O_{12}$ (wherein A is at least one element selected from the group consisting of Ca, Sr, and Ba, M is Nb and/or Ta, and x is preferably 0.5 or less (including 0)), $Li_3M_{2-x}L_2O_{12}$ (wherein M is Nb and/or Ta, L includes Zr, and x is preferably 0.5 or less (including 0)), $Li_{7-3x}Al_xLa_3Zr_3O_{12}$ (wherein x is preferably 0.5 or less (including 0)), and $Li_7La_3Zr_2O_{12}$. Among them, $Li_{6.25}Al_{0.25}La_3Zr_3O_{12}$, $Li_{6.4}La_3Zr_{1.4}Ta_{0.6}O_{12}$, $Li_{6.4}La_3Zr_{1.6}Ta_{0.6}O_{12}$, and $Li_7La_3Zr_2O_{12}$ are excellent in discharge performance and cycle life performance because they have high ion conductivity and are electrochemically stable. The inorganic particles having a specific surface area of 5 to 500 m²/g (preferably 50 to 500 m²/g) have an advantage of being chemically stable to an organic electrolytic solution containing an organic solvent.

Examples of the inorganic solid electrolytes having high lithium ion conductivity include lithium phosphate solid electrolytes having a NASICON-type structure. The lithium phosphate solid electrolyte having a NASICON-type structure has high stability to water, and is thus difficult to elute into water. It is also stable in the air. Examples of the lithium phosphate solid electrolyte having a NASICON-type structure include $LiM1_2(PO_4)_3$, wherein M1 is one or more elements selected from the group consisting of Ti, Ge, Sr, Zr, Sn, and Al. Further, there are indicated lithium phosphate solid electrolytes having a NASICON-type structure and represented by $Li_{1+y}Al_xM_{2-x}(PO_4)_3$ (wherein M is at least one element selected from the group consisting of Ti, Ge, Sr, Sn, Zr, and Ca, $0 \leq x \leq 1$, $0 \leq y \leq 1$). Preferred examples include $Li_{1+x}Al_xGe_{2-x}(PO_4)_3$, $Li_{1+x}Al_xZr_{2-x}(PO_4)_3$, and $Li_{1+x}Al_xTi_{2-x}(PO_4)_3$. In the respective formulas, x is preferably within a range from 0 to 0.5. The exemplified solid electrolytes each have high ionic conductivity, excellent stability in the air, and high electrochemical stability. Both a lithium phosphate solid electrolyte having a NASICON-type structure and an oxide solid electrolyte having a garnet-type structure may be used as inorganic solid electrolytes having high lithium ion conductivity.

The lithium ion conductor layer may contain, as inorganic solid electrolyte particles free of lithium, at least one selected from the group consisting of sulfides such as $75Na_2S$—$P_2S_5$ (mol %), glass ceramics such as $Na_2FeP_2O_7$, complex hydrides such as $Na_2B_{10}H_{10}$, $\beta$-$Fe_2(SO_4)$ type ionic conductors, and $Na_2O.11Al_2O_3$ of $\beta$-alumina.

The content of the lithium-containing inorganic particles and the lithium-free inorganic solid electrolyte particles in the lithium ion conductor layer can be within a range from 80% by mass to 98% by mass. By setting it to 80% by mass or more, self-discharge due to an internal short circuit caused by decrease in strength of the lithium ion conductor layer can be avoided. By setting it to 98% by mass or less, it is possible to prevent an abrupt decrease in ion conductivity of the lithium ion conductor layer, thereby improving the discharge performance and the low temperature performance. The content is more preferably within a range from 90% by mass to 95% by mass.

The lithium ion conductor layer can contain a polymer. The polymer is not particularly limited as long as it can gel an organic electrolytic solution containing lithium ions, and both a chemical gelling agent and a physical gelling agent can be used. Examples of the polymer include those which can form a composite with a carbonate such as polyacrylonitrile (PAN), polyethylene oxide (PEO), polyvinylidene fluoride (PVdF), or polymethyl methacrylate to form a gel. A polymer electrolyte in which a composite of a carbonate and a polymer is gelled is produced, so that the ion conductivity of the lithium ion conductor layer is increased. A gel-like polymer electrolyte containing polyacrylonitrile is preferable because of high ion conductivity and improved discharge performance and low temperature performance. The proportion of the polymer in the lithium ion conductor layer is preferably within a range from 1% by weight to 10% by weight. If the proportion falls outside this range, the low temperature performance and the discharge performance may be deteriorated. One or more kinds of polymers can be used. When the above kind of polymer is combined with sulfide solid electrolyte particles having high lithium ion conductivity, the sulfur component may be dissolved.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. Li/Li$^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the embodiment will be described in detail with reference to the drawings.

FIG. 2 is a sectional view schematically showing one example of a secondary battery according to an embodiment. FIG. 3 is an enlarged sectional view of a portion A of the secondary battery shown in FIG. 2.

The secondary battery 100 shown in FIG. 2 and FIG. 3 includes a bag-shaped container member 2 shown in FIG. 2, an electrode group 1 shown in FIG. 2 and FIG. 3, and an electrolyte (not shown). The electrode group 1 and the electrolyte are stored in the bag-shaped container member 2. The electrolyte (not shown) is held in the electrode group 1.

The bag-shaped container member 2 is formed from a laminate film including two resin layers and a metal layer disposed therebetween.

As shown in FIG. 2, the electrode group 1 is a flat wound electrode group. The flat wound electrode group 1 includes negative electrodes 3, separators 4, and positive electrodes 5 as shown in FIG. 3. The separator 4 is disposed between the negative electrode 3 and the positive electrode 5.

A negative electrode 3 includes a negative electrode current collector 3a and negative electrode active material-containing layers 3b. In the portion of the negative electrode 3 located at the outermost shell of a wound electrode group 1, the negative electrode active material-containing layer 3b is formed only on the inside surface side of the negative electrode current collector 3a, as shown in FIG. 3. In another portion of the negative electrode 3, the negative electrode active material-containing layer 3b is formed on both sides of the negative electrode current collector 3a.

A positive electrode 5 includes a positive electrode current collector 5a and a positive electrode active material-containing layer 5b formed on both sides thereof.

As shown in FIG. 2, a negative electrode terminal 6 and a positive electrode terminal 7 are positioned near the outer end of the wound electrode group 1. The negative electrode terminal 6 is connected to the outermost part of the negative electrode current collector 3a. In addition, the positive electrode terminal 7 is connected to the outermost part of the positive electrode current collector 5a. The negative electrode terminal 6 and the positive electrode terminal 7 extend outward from opening portions of the bag-shaped container member 2. A thermoplastic resin layer is provided on the inner surface of the bag-shaped container member 2, and the opening of the bag-shaped container member 2 are closed by thermal fusion bonding of the thermoplastic resin layer.

The secondary battery according to the embodiment is not limited to the secondary battery having the structure shown in FIGS. 2 and 3, and may be, for example, a battery having a structure shown in FIGS. 4 and 5.

FIG. 4 is a partial cut-away sectional perspective view schematically showing another example of the secondary battery according to the embodiment. FIG. 5 is an enlarged sectional view of a portion B of the secondary battery shown in FIG. 4.

The secondary battery 100 shown in FIGS. 4 and 5 includes an electrode group 1 shown in FIGS. 4 and 5, a container member 2 shown in FIG. 4, and an electrolyte (not shown). The electrode group 1 and the electrolyte are stored in the container member 2. The electrolyte is held in the electrode group 1.

The container member 2 is made of a laminate film including two resin layers and a metal layer intervening therebetween.

As shown in FIG. 5, the electrode group 1 is a laminated electrode group. The laminated electrode group 1 has a structure in which a negative electrode 3 and a positive electrode 5 are alternately laminated with a separator 4 intervening therebetween.

The electrode group 1 includes a plurality of the negative electrodes 3. The plurality of negative electrodes 3 are each provided with a negative electrode current collector 3a and a negative electrode active material-containing layer 3b carried on both sides of the negative electrode current collector 3a. Further, the electrode group 1 includes a plurality of the positive electrodes 5. The plurality of positive electrodes 5 are each provided with a positive electrode current collector 5a and a positive electrode active material-containing layer 5b carried on both sides of the positive electrode current collector 5a.

The negative electrode current collector 3a of each negative electrode 3 includes a portion 3c on one side where the negative electrode active material-containing layer 3b is not carried on any surfaces. This portion 3c acts as a negative electrode tab. As shown in FIG. 5, the portion 3c acting as the negative electrode tab does not overlap the positive electrode 5. In addition, a plurality of negative electrode tabs (portion 3c) is electrically connected to a belt-shaped negative electrode terminal 6. A tip of the belt-shaped negative electrode terminal 6 is drawn outward from a container member 2.

In addition, although not shown, the positive electrode current collector 5a of each positive electrode 5 includes a portion on one side where the positive electrode active material-containing layer 5b is not carried on any surfaces. This portion acts as a positive electrode tab. Like the negative electrode tab (portion 3c), the positive electrode tab does not overlap the negative electrode 3. In addition, the positive electrode tab is positioned on the opposite side of the electrode group 1 with respect to the negative electrode tab (portion 3c). The positive electrode tab is electrically connected to a belt-shaped positive electrode terminal 7. A tip of the belt-shaped positive electrode terminal 7 is positioned on the opposite side to the negative electrode terminal 6 and is drawn outward from the container member 2.

The secondary battery according to the second embodiment includes the electrode according to the first embodiment. For this reason, the secondary battery according to the second embodiment has excellent cycle life properties and is capable of suppressing an increase in electrical resistance.

Third Embodiment

According to the third embodiment, a battery module is provided. The battery module according to the third embodiment is equipped with a plurality of the secondary batteries according to the second embodiment.

In the battery module according to the embodiment, individual unit cells may be electrically connected in series or in parallel, or may be arranged in combination of series connection and parallel connection.

Next, an example of the battery module according to the embodiment will be described with reference to the drawings.

FIG. 6 is a perspective view schematically showing an example of the battery module according to the embodiment. The battery module 200 shown in FIG. 6 includes five unit cells 100a to 100e, four bus bars 21, a positive electrode-side lead 22, and a negative electrode-side lead 23. Each of the five unit cells 100a to 100e is the secondary battery according to the second embodiment.

The busbar 21 connects a negative electrode terminal 6 of a single unit cell 100a to a positive electrode terminal 7 of an adjacently positioned unit cell 100b. In this way, the five unit cells 100a to 100e are connected in series by the four bus bars 21. That is, the battery module 200 shown in FIG. 6 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 7 of at least one battery among the five unit cells 100a to 100e is electrically connected to a positive electrode lead 22 for external connection. Also, the negative electrode terminal 6 of at least one battery among the five unit cells 100a to 100e is electrically connected to a negative electrode lead 23 for external connection.

The battery module according to the third embodiment includes the secondary batteries according to the second embodiment. Consequently, the battery module according to the third embodiment has excellent cycle life properties and is capable of suppressing an increase in electrical resistance.

Fourth Embodiment

According to the fourth embodiment, a battery pack is provided. The battery pack includes the battery module according to the third embodiment. The battery pack may also be equipped with a single secondary battery according to the second embodiment instead of the battery module according to the third embodiment.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

Figure 7:
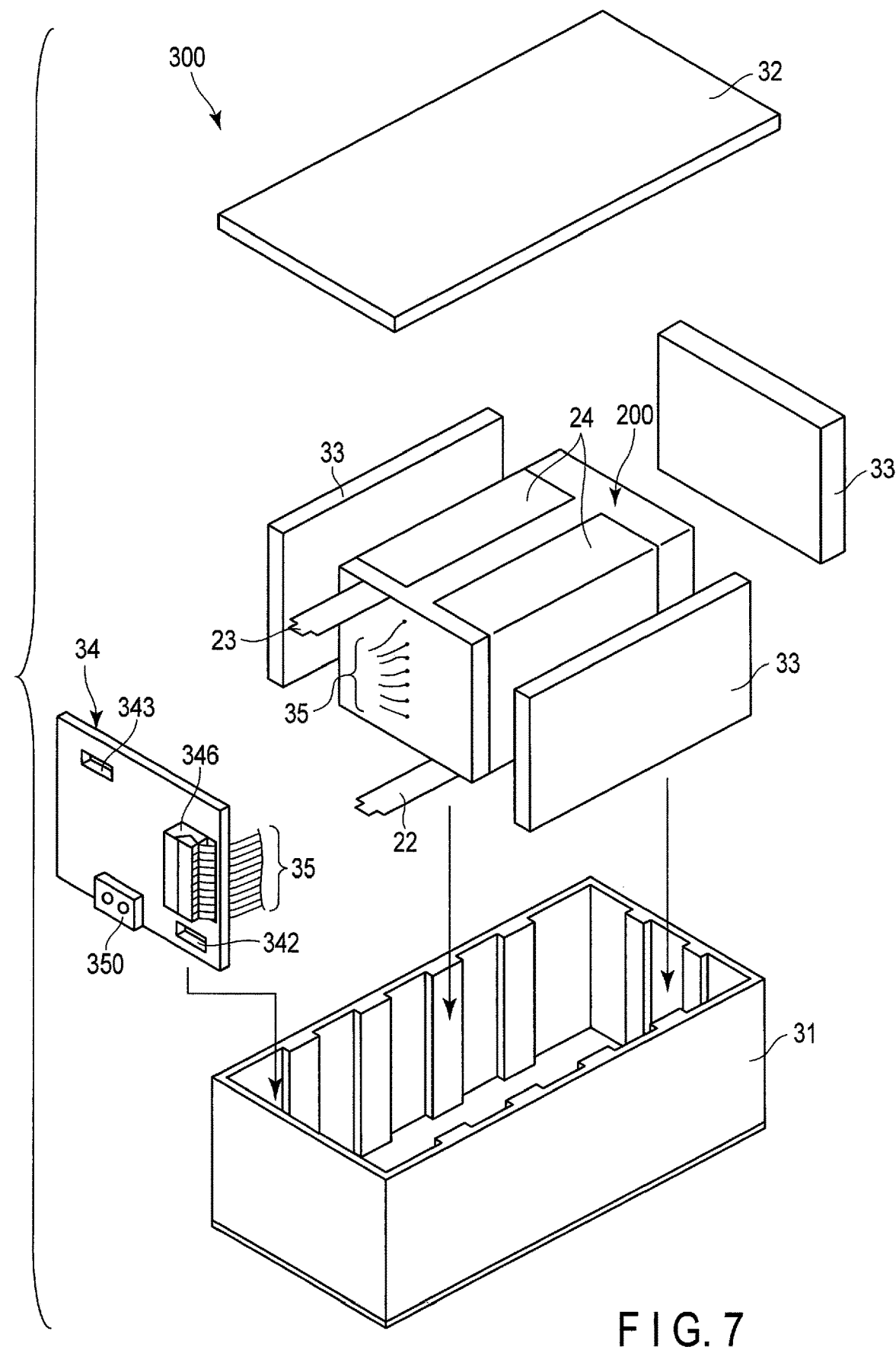
FIG. 7 is an exploded perspective view schematically illustrating one example of a battery pack according to an embodiment.
Figure 8:
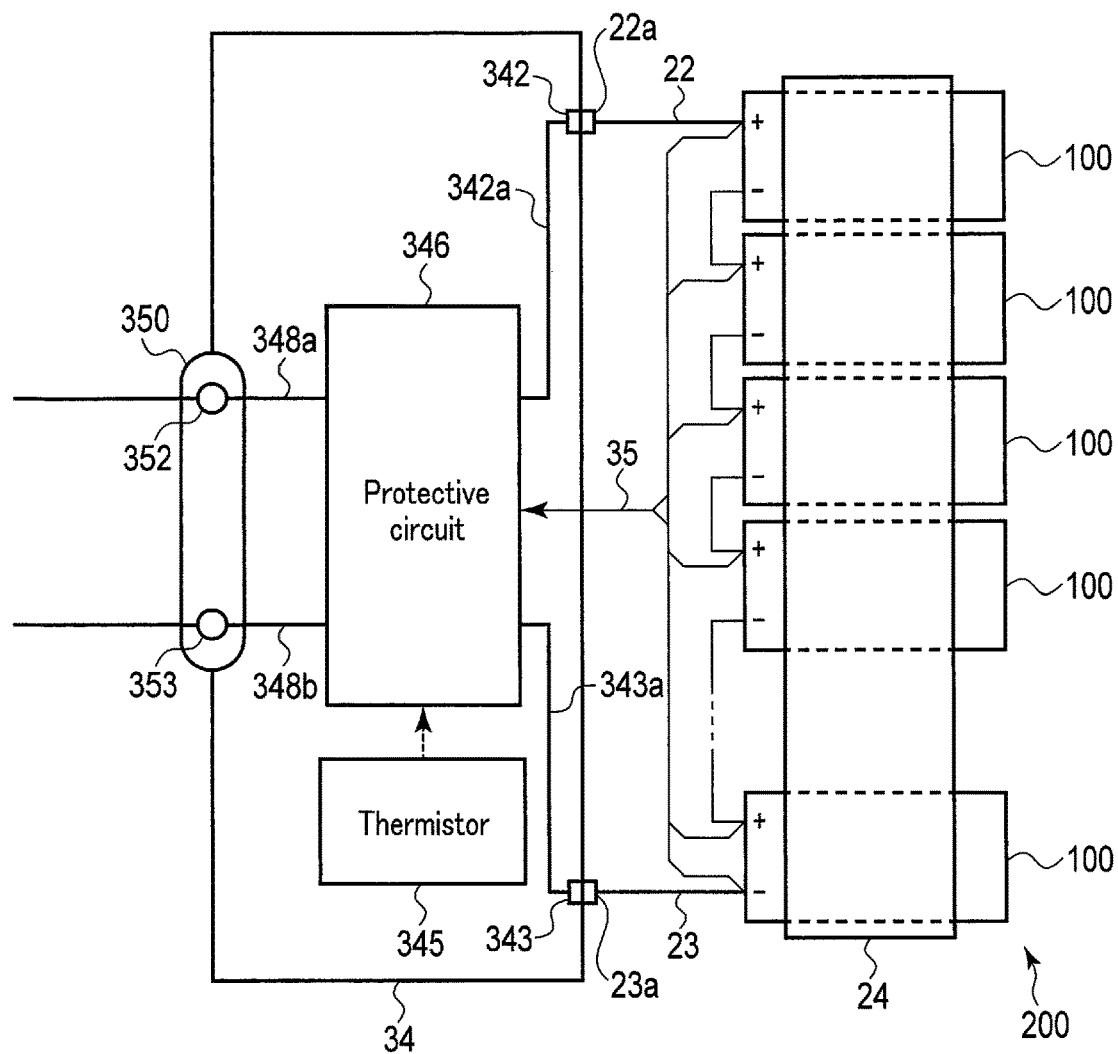
FIG. 8 is a block diagram illustrating one example of an electric circuit of the battery pack illustrated in FIG. 7.

FIG. 7 is an exploded perspective view schematically showing an example of the battery pack according to the embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

A housing container 31 shown in FIG. 7 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the second embodiment. Each unit cell 100 in the plurality of unit cells 100 is electrically connected in series, as shown in FIG. 8. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342*a* and 343*a*, an external power distribution terminal 350, a plus-side wire (positive-side wire) 348*a*, and a minus-side wire (negative-side wire) 348*b*. One principal surface of the printed wiring board 34 faces one side surface of the battery module 200. An insulating plate (not shown) is disposed in between the printed wiring board 34 and the battery module 200.

The other terminal 22*a* of the positive electrode lead 22 is electrically connected to a positive electrode connector 342. The other terminal 23*a* of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348*a*. The protective circuit 346 is connected to the negative side terminal 353 via the minus-side wire 348*b*. In addition, the protective circuit 346 is electrically connected to the positive electrode connector 342 via the wiring 342*a*. The protective circuit 346 is electrically connected to the negative electrode connector 343 via the wiring 343*a*. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fourth embodiment includes the secondary battery according to the second embodiment or the battery module according to the third embodiment. Consequently, according to the fourth embodiment, it is possible to provide a battery pack provided with a secondary battery or a battery module having excellent cycle life properties and capable of suppressing an increase in electrical resistance.

Fifth Embodiment

According to the fifth embodiment, a vehicle is provided. The vehicle includes the battery pack according to the fourth embodiment.

In a vehicle according to the fifth embodiment, the battery pack is configured, for example, to recover regenerative energy from motive force of the vehicle. The vehicle may include a mechanism configured to convert kinetic energy of the vehicle into regenerative energy.

Examples of the vehicle according to the fifth embodiment include two- to four-wheeled hybrid electric automobiles, two- to four-wheeled electric automobiles, electric assist bicycles, and railway cars.

In the vehicle according to the fifth embodiment, the installing position of the battery pack is not particularly limited. For example, the battery pack may be installed in the engine compartment of the vehicle; in rear parts of the vehicle, or under seats.

A plurality of battery packs is loaded on the vehicle according to the fifth embodiment. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the fifth embodiment will be described with reference to the drawings.

Figure 9:
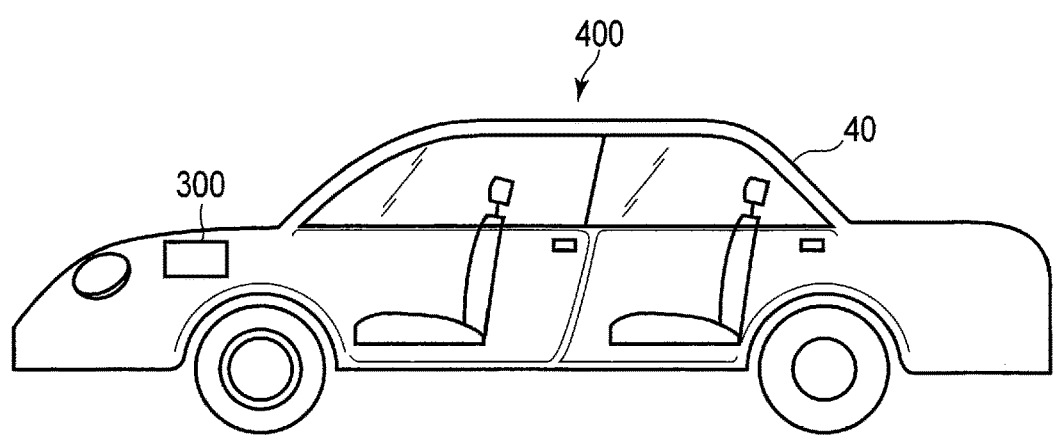
FIG. 9 is a partially transparent diagram schematically illustrating one example of a vehicle according to an embodiment.

FIG. 9 is a partially transparent diagram schematically illustrating one example of a vehicle according to the embodiment.

A vehicle 400 illustrated in FIG. 9 includes a vehicle body 40 and a battery pack 300 according to the embodiment. In the example illustrated in FIG. 9, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 9, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the fifth embodiment will be described with reference to FIG. 10.

FIG. 10 is a diagram schematically illustrating one example of a control system related to an electrical system in the vehicle according to the fifth embodiment. The vehicle 400 illustrated in FIG. 10 is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 10) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line L1 is connected to the negative electrode terminal 414 of the vehicle power source 41. The other terminal of the connection line L1 is connected to a negative electrode input terminal 417 of the inverter 44. On the connection line L1, a current detector (current detection circuit) 416 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

The vehicle according to the fifth embodiment includes the battery pack according to the fourth embodiment. Consequently, according to the fifth embodiment, it is possible to provide a vehicle equipped with battery packs having excellent cycle life properties and capable of suppressing an increase in electrical resistance.

EXAMPLES

Although Examples will be described hereinafter, the embodiments are not limited to Examples to be described hereinafter.

Example 1

<Production of Positive Electrode>

A slurry for forming the active material-containing layer was prepared by providing 90% by mass of lithium cobalt oxide ($LiCoO_2$) powder as a positive electrode active material, 5% by mass of acetylene black as a conductive agent, and 5% by mass of polyvinylidene fluoride (PVdF) as a binder, dispersing these materials in N-methyl-2-pyrrolidone (NMP) and as a dispersion solvent, and mixing them. Each of the above blending quantities is a mass with respect to the mass of the positive electrode active material-containing layer. This slurry was applied to both sides of the current collector made of an aluminum foil having a thickness of 12 μm, and dried. Further, pressing was performed to produce a positive electrode having a positive electrode active material-containing layer.

<Preparation of Negative Electrode>

(Production of First Layer)

A slurry was prepared by providing 92% by mass of $Nb_2TiO_7$ powder with an average primary particle size of 1 μm as a monoclinic niobium titanium composite oxide, 5% by mass of acetylene black as a conductive agent, and 1% by mass of CMC and 2% by mass of SER as binders, dispersing these materials in pure water as a dispersion solvent and mixing them. Each of the above blending quantities is a mass with respect to the mass of the first layer. This slurry was applied to both sides of the current collector made of an aluminum foil having a thickness of 12 μm and dried. Roll pressing was further performed to obtain a laminate in which the first layer was laminated. The conditions of the roll pressing were a pressing load of 20 tons and a pressing speed of 1 m/min.

(Production of Second Layer)

A slurry was prepared by providing 90% by mass of $Li_4Ti_5O_{12}$ powder having an average primary particle size of 1 μm as lithium titanate having a spinel structure, 5% by mass of acetylene black as a conductive agent, and 5% by mass of PVdF as a binder, dispersing these materials in NMP as a dispersion medium and mixing them. Each of the above blending quantities is a mass with respect to the mass of the second layer. The slurry was spray-applied onto both sides of the first layer previously produced on both sides of the current collector and dried. Further, roll pressing was performed to produce a negative electrode in which the second layer was laminated on the first layer. The conditions of the roll pressing were a pressing load of 16 tons and a pressing speed of 1 m/min.

<Formation of Separator>

As described below, an organic fiber layer as the separator was formed on the second layer by the electrospinning method. Specifically, first, a polyimide was dissolved in dimethylacetamide to prepare a raw material solution. The concentration of the polyimide in the raw material solution was 80% by mass. A high voltage generator was used to apply a voltage of 30 kV to a spinning nozzle of an electrospinning apparatus. Using a metering pump, the raw material solution was supplied to the spinning nozzle, and discharged from the spinning nozzle toward the negative electrode surface (second layer surface). By moving the spinning nozzle on the negative electrode surface, a polymer fiber layer was formed on the negative electrode surface. Next, the negative electrode provided with the polymer fiber layer was roll-pressed to obtain a negative electrode structure in which the polymer fiber layer was laminated on the negative electrode. The roll pressing conditions were a press pressure of 3000 N and a pressing speed of 1 m/min. The film thickness of the polymer fiber layer after pressing was 2 μm. The average diameter of the organic fibers was about 1 μm, and the basis weight of the polymer fiber layer was 1.5 $g/m^2$.

<Measurement of Porosity and Thickness>

The negative electrode structure was cut to measure the porosities of the first layer and the second layer and the thicknesses of the first layer and the second layer, according to the method described in the first embodiment. The porosity of the first layer was 25%, the porosity of the second layer was 35%, the thickness of the first layer was 16 μm, and the thickness of the second layer was 4 μm.

<Production of Secondary Battery>

The produced negative electrode structure and the positive electrode were vacuum-dried, and then these were alternately laminated to produce an electrode group. A pack made of a laminate film with a thickness of 0.1 mm, composed of an aluminum foil with a thickness of 40 μm and a polypropylene layer formed on both sides of this aluminum foil, was provided. The resulting electrode group was stored in the pack. The pack and electrode group were subjected to vacuum drying at 120° C. for 24 hours. Thereafter, a nonaqueous electrolytic solution in which $LiPF_6$ as an electrolyte salt was dissolved at 1.2 mol/L in a mixed solvent of polycarbonate and diethyl carbonate (volume ratio 1:2) was prepared. After injection of the nonaqueous electrolytic solution into the laminated film pack storing the electrode group therein, the pack was completely sealed by heat sealing to produce a secondary battery.

Example 2

A secondary battery was produced in the same manner as in Example 1 except that the roll pressing condition for producing the first layer was a pressing load of 22 tons.

Example 3

A secondary battery was produced in the same manner as in Example 1 except that the roll pressing condition for producing the first layer was a pressing load of 18 tons.

Example 4

A secondary battery was produced in the same manner as in Example 1 except that the roll pressing condition for producing the second layer was a pressing load of 14 tons.

Example 5

A secondary battery was produced in the same manner as in Example 1 except that the roll pressing condition for producing the second layer was a pressing load of 12 tons.

Example 6

A secondary battery was produced in the same manner as in Example 1 except that the roll pressing condition for producing the second layer was a pressing load of 10 tons.

Example 7

A secondary battery was produced in the same manner as in Example 1 except that the roll pressing condition for producing the second layer was a pressing load of 8 tons.

Example 8

A secondary battery was produced in the same manner as in Example 1 except that roll pressing was omitted in the production of the second layer. That is, a secondary battery was produced using, as the negative electrode according to Example 8, a product obtained by applying the second layer forming slurry onto the pressed first layer and drying it.

Example 9

A secondary battery was produced in the same manner as in Example 1 except that the roll pressing condition for producing the first layer was a pressing load of 16 tons, and the roll pressing condition for producing the second layer was a pressing load of 12 tons.

Example 10

A secondary battery was produced in the same manner as in Example 1, except that, when the second layer was produced, the basis weight (also called weight per unit area) [$g/m^2$] of the slurry to be applied was 0.25 times that in Example 1.

Example 11

A secondary battery was produced in the same manner as in Example 1, except that, when the second layer was produced, the basis weight [$g/m^2$] of the slurry to be applied was 0.5 times that in Example 1.

Example 12

A secondary battery was produced in the same manner as in Example 1, except that, when the second layer was produced, the basis weight [$g/m^2$] of the slurry to be applied was 1.5 times that in Example 1.

Example 13

A secondary battery was produced in the same manner as in Example 1, except that, when the second layer was produced, the basis weight [$g/m^2$] of the slurry to be applied was 2.5 times that in Example 1.

Example 14

A secondary battery was produced in the same manner as in Example 1 except that the film thickness of the polymer fiber layer as the separator was 1.5 μm.

Example 15

A secondary battery was produced in the same manner as in Example 1 except that the film thickness of the polymer fiber layer as the separator was 10 μm.

Example 16

A secondary battery was produced in the same manner as in Example 1, except that $Nb_{10}Ti_2O_{29}$ having an average primary particle size of 1 μm was used as the monoclinic niobium titanium composite oxide.

Example 17

A secondary battery was produced in the same manner as in Example 1, except that $Nb_{24}TiO_{62}$ having an average primary particle size of 1 μm was used as the monoclinic niobium titanium composite oxide.

Comparative Example 1

A secondary battery was produced in the same manner as in Example 1 except for the following matter.
When the first layer was produced, the first layer forming slurry was applied onto both sides of the current collector and dried. The second layer forming slurry was then applied onto the first layer and dried, without pressing. Thereafter, the unpressed first layer and second layer were roll-pressed at a pressing load of 20 tons and a pressing speed of 1 m/min to produce a negative electrode.

Comparative Example 2

A secondary battery was produced in the same manner as in Example 1 except that the formation of the second layer was omitted.

<Measurement of Self-Discharge Amount>

For each of the produced secondary batteries of Examples 1 to 17 and Comparative Examples 1 and 2, the self-discharge amount was measured as follows.

First, each secondary battery was charged in a temperature environment of 25° C. until the state of charge (SOC) reached 100%, and then discharged until the SOC reached 0%. Next, the discharged battery was charged until the SOC reached 50%, and the battery voltage immediately after charging was measured using a tester. The battery voltage at this time was defined as initial voltage V. Next, the battery was allowed to stand at room temperature for 1 day, and then the battery voltage was measured using a tester. The battery voltage at this time was defined as V1. The battery was allowed to stand for additional 2 days (3 days in total), and then the battery voltage was measured using the tester. The battery voltage at this time was defined as V3.

A decrease voltage ΔV was calculated by subtracting the battery voltage V3 from the battery voltage V1, and this is regarded as self-discharge amount. The column of "Self-discharge amount (ratio)" in Table 1 below indicates the ratio of the self-discharge amount in each example when the self-discharge amount according to Comparative Example 1 is 1. Therefore, a lower numerical value in each example means higher performance of suppressing self-discharge.

<Resistance Measurement>

First, each secondary battery was charged in a temperature environment of 25° C. until the SOC reached 100% at a charge rate of 1C (current value at which the SOC reached 0% in 1 hour when the battery was discharged from SOC 100%). The depth of charge was adjusted by discharging until the SOC reached 50% at a discharge rate of 1C. Thereafter, the battery was discharged at 10C for 10 seconds, and the internal resistance (resistance value) was determined from the voltage change for 10 seconds and the current value.

The column of "Resistance value (ratio)" in Table 1 below indicates the ratio of the resistance value in each example when the resistance value according to Comparative Example 1 is 1. Therefore, a lower numerical value in each example means a lower-resistance secondary battery.

The above results are summarized in Table 1 below. In Table 1, the column of "Self-discharge amount ratio * resistance value ratio" indicates a numerical value obtained by multiplying the value of the "Self-discharge amount (ratio)" by the value of the "Resistance value (ratio)". A lower value of the "Self-discharge amount ratio * resistance value ratio" indicates that both resistance reduction and self-discharge suppression can be achieved.

TABLE 1

| | First layer active material composition | Second layer active material composition | First layer porosity P1 [%] | Second layer porosity P2 [%] | Ratio P2/P1 | First layer thickness T1 [μm] | Second layer thickness T2 [μm] | Ratio T2/T1 | Separator thickness [μm] | Self-discharge amount (ratio) | Resistance value (ratio) | Self-discharge amount ratio* resistance value ratio |
|---|---|---|---|---|---|---|---|---|---|---|---|---|
| Example 1 | $Nb_2TiO_7$ | $Li_4Ti_5O_{12}$ | 25 | 35 | 1.4 | 16 | 4 | 0.25 | 2 | 0.90 | 0.82 | 0.74 |
| Example 2 | $Nb_2TiO_7$ | $Li_4Ti_5O_{12}$ | 20 | 35 | 1.8 | 16 | 4 | 0.25 | 2 | 1.05 | 0.85 | 0.89 |
| Example 3 | $Nb_2TiO_7$ | $Li_4Ti_5O_{12}$ | 30 | 35 | 1.2 | 16 | 4 | 0.25 | 2 | 1.00 | 0.77 | 0.77 |
| Example 4 | $Nb_2TiO_7$ | $Li_4Ti_5O_{12}$ | 25 | 40 | 1.6 | 16 | 4 | 0.25 | 2 | 0.95 | 0.78 | 0.75 |
| Example 5 | $Nb_2TiO_7$ | $Li_4Ti_5O_{12}$ | 25 | 50 | 2.0 | 16 | 4 | 0.25 | 2 | 1.00 | 0.77 | 0.77 |
| Example 6 | $Nb_2TiO_7$ | $Li_4Ti_5O_{12}$ | 25 | 60 | 2.4 | 16 | 4 | 0.25 | 2 | 1.10 | 0.73 | 0.80 |
| Example 7 | $Nb_2TiO_7$ | $Li_4Ti_5O_{12}$ | 25 | 70 | 2.8 | 16 | 4 | 0.25 | 2 | 1.14 | 0.72 | 0.82 |
| Example 8 | $Nb_2TiO_7$ | $Li_4Ti_5O_{12}$ | 25 | 80 | 3.2 | 16 | 4 | 0.25 | 2 | 1.29 | 0.70 | 0.90 |
| Example 9 | $Nb_2TiO_7$ | $Li_4Ti_5O_{12}$ | 35 | 50 | 1.4 | 16 | 4 | 0.25 | 2 | 1.10 | 0.75 | 0.82 |
| Example 10 | $Nb_2TiO_7$ | $Li_4Ti_5O_{12}$ | 25 | 35 | 1.4 | 16 | 1 | 0.063 | 2 | 1.33 | 0.68 | 0.91 |
| Example 11 | $Nb_2TiO_7$ | $Li_4Ti_5O_{12}$ | 25 | 35 | 1.4 | 16 | 2 | 0.125 | 2 | 1.24 | 0.73 | 0.91 |
| Example 12 | $Nb_2TiO_7$ | $Li_4Ti_5O_{12}$ | 25 | 35 | 1.4 | 16 | 6 | 0.375 | 2 | 0.81 | 0.88 | 0.72 |
| Example 13 | $Nb_2TiO_7$ | $Li_4Ti_5O_{12}$ | 25 | 35 | 1.4 | 16 | 10 | 0.63 | 2 | 0.76 | 0.97 | 0.74 |
| Example 14 | $Nb_2TiO_7$ | $Li_4Ti_5O_{12}$ | 25 | 35 | 1.4 | 16 | 4 | 0.25 | 1.5 | 1.00 | 0.78 | 0.78 |
| Example 15 | $Nb_2TiO_7$ | $Li_4Ti_5O_{12}$ | 25 | 35 | 1.4 | 16 | 4 | 0.25 | 10 | 0.81 | 0.97 | 0.78 |
| Example 16 | $Nb_{10}Ti_2O_{29}$ | $Li_4Ti_5O_{12}$ | 25 | 35 | 1.4 | 16 | 4 | 0.25 | 2 | 1.05 | 0.87 | 0.91 |
| Example 17 | $Nb_{24}TiO_{62}$ | $Li_4Ti_5O_{12}$ | 25 | 35 | 1.4 | 16 | 4 | 0.25 | 2 | 1.14 | 0.83 | 0.95 |
| Comparative Example 1 | $Nb_2TiO_7$ | $Li_4Ti_5O_{12}$ | 25 | 15 | 0.6 | 16 | 4 | 0.25 | 2 | 1.00 | 1.00 | 1.00 |
| Comparative Example 2 | $Nb_2TiO_7$ | $Li_4Ti_5O_{12}$ | 25 | None | — | 16 | None | — | 2 | 1.90 | 0.73 | 1.40 |

The following matters can be understood from Table 1.

As shown in Examples 1 to 17, it can be understood that secondary batteries having low resistance and suppressed in self-discharge, as compared with those of Comparative Examples 1 and 2, were obtained, when the porosity P2 of the second layer was within a range from 30% to 80%.

When the porosity P2 of the second layer is increased without changing the thickness of the second layer, the self-discharge amount tends to increase, whereas the resistance value tends to decrease. This is considered to be because the ion conductivity in the thickness direction of the second layer is increased.

When the ratio T2/T1 is increased without changing the porosity ratio P2/P1, the self-discharge amount tends to decrease, and the resistance value tends to increase. In Examples 1 to 7, 9, and 11 to 17 in which the porosity ratio P2/P1 was within a range from 1.2 to 2.8 and the ratio T2/T1 was within a range from 0.10 to 1, secondary batteries in which the self-discharge amount and the resistance value were well balanced could be achieved.

It can be understood that, when the porosity P1 of the first layer is within a range from 20% to less than 30% and the porosity of the second layer is within a range from 35% to 70%, a secondary battery in which the self-discharge amount and the resistance value are well balanced can be achieved.

According to at least one embodiment and example described above, an electrode is provided. The electrode includes a current collector, a first layer formed on the current collector, and a second layer formed on at least part of the first layer. The first layer contains a monoclinic niobium titanium composite oxide. The second layer contains lithium titanate having a spinel structure. A porosity P2 of the second layer is within a range from 30% to 80%.

According to the electrode, it is possible to realize a secondary battery that has low resistance and is suppressed in self-discharge.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
    a current collector;
    a first layer formed on the current collector and comprising a monoclinic niobium titanium composite oxide; and
    a second layer formed on at least part of the first layer and comprising lithium titanate having a spinel structure, wherein
    a porosity P2 of the second layer is within a range from 30% to 80%.

2. The electrode according to claim 1, wherein a ratio P2/P1 of the porosity P2 of the second layer to a porosity P1 of the first layer is within a range from 1.2 to 2.8.

3. The electrode according to claim 1, wherein a porosity P1 of the first layer is less than 30%, and the porosity P2 of the second layer is 30% or more.

4. The electrode according to claim 1, wherein a ratio T2/T1 of a thickness T2 of the second layer to a thickness T1 of the first layer is within a range from 0.10 to 1.

5. The electrode according to claim 1, wherein a porosity P1 of the first layer is within a range from 20% to less than 30%, and the porosity P2 of the second layer is within a range from 30% to 70%.

6. The electrode according to claim 1, wherein
    the monoclinic niobium titanium composite oxide is at least one selected from the group consisting of a composite oxide represented by the general formula $Li_xTi_{1-y}M1_yNb_{2-z}M2_zO_{7+\delta}$ and a composite oxide represented by the general formula $Li_xTi_{1-y}M3_{y+z}Nb_{2-z}O_{7-\delta}$,
    M1 is at least one selected from the group consisting of Zr, Si, and Sn, M2 is at least one selected from the group consisting of V, Ta, and Bi, and M3 is at least one selected from the group consisting of Mg, Fe, Ni, Co, W, Ta, and Mo, and
    x satisfies $0 \leq x \leq 5$, y satisfies $0 \leq y < 1$, z satisfies $0 \leq z < 2$, and $\delta$ satisfies $-0.3 \leq \delta \leq 0.3$.

7. The electrode according to claim 1, wherein the lithium titanate having the spinel structure is represented by the general formula $Li_{4+a}Ti_5O_{12}$ ($-1 \leq a \leq 3$).

8. A secondary battery comprising: a positive electrode; a negative electrode; and an electrolyte, wherein
    the negative electrode is the electrode according to claim 1.

9. A battery pack comprising the secondary battery according to claim 8.

10. The battery pack according to claim 9, further comprising:
    an external power distribution terminal; and
    a protective circuit.

11. The battery pack according to claim 9, comprising a plurality of the secondary battery, wherein
    the secondary batteries are electrically connected in series, in parallel, or in a combination of in-series and in-parallel.

12. A vehicle comprising the battery pack according to claim 9.

13. The vehicle according to claim 12, further comprising a mechanism configured to convert kinetic energy of the vehicle into regenerative energy.

* * * * *